United States Patent [19]

Poole et al.

[11] Patent Number: 4,572,837
[45] Date of Patent: Feb. 25, 1986

[54] PROTEIN PRODUCT

[75] Inventors: Stephen Poole; Stuart I. West; Clifford L. Walters, all of Leatherhead, England

[73] Assignee: The British Food Manufacturing Industries Research Association, Leatherhead, England

[21] Appl. No.: 625,646

[22] Filed: Jun. 28, 1984

[51] Int. Cl.[4] .......................... A23J 3/00; A23L 1/04; A23L 1/24; A23G 3/00
[52] U.S. Cl. .................... 426/564; 426/573; 426/572; 426/602; 426/613; 426/605; 426/804; 426/656; 426/657
[58] Field of Search ............... 426/660, 656, 657, 564, 426/568, 570, 571, 572, 573, 574, 602, 613, 605, 801, 804

[56] References Cited

U.S. PATENT DOCUMENTS

| | | | |
|---|---|---|---|
| 2,183,515 | 12/1939 | Mink | 426/614 |
| 3,870,811 | 3/1975 | Schulz | 426/656 |
| 3,899,609 | 8/1975 | Lonneker et al. | 426/656 |
| 3,900,576 | 8/1975 | Schulz | 426/656 |
| 3,939,284 | 2/1976 | Akin et al. | 426/656 |
| 4,082,857 | 4/1978 | Croome | 426/573 |
| 4,178,391 | 12/1979 | Chao | 426/656 |
| 4,228,198 | 10/1980 | Burge | 426/656 |
| 4,234,609 | 11/1980 | Witte | 426/656 |
| 4,238,480 | 12/1980 | Sawyer | 424/177 |
| 4,265,917 | 5/1981 | Fabre | 426/656 |
| 4,292,336 | 9/1981 | Latymer | 426/656 |
| 4,409,248 | 10/1983 | Lehnhardt et al. | 426/656 |
| 4,474,694 | 10/1984 | Coco et al. | 426/656 |

FOREIGN PATENT DOCUMENTS 2061019 of 0000 France .
1334397 of 0000 United Kingdom .

OTHER PUBLICATIONS

Schweizerisches Lebensmittelbuch, Schweiz. Verein analytischer Chemiker.
The Merck Index, Tenth Edition, 1983; An Encyclopedia of Chemicals, Drugs and Biologicals.
1373 Journal of the Science of Food and Agriculture, vol. 35, (1984) Jun., No. 6, Oxford, Great Britain, pp. 701–711.
D. J. Cram, et al.: "Organic Chemistry", 1959, p. 589, McGraw-Hill Book Company, Inc., London, GB.
Journal of Agricultural and Food Chemistry, vol. 31, No. 5, Sep./Oct. 1983, pp. 972-978, American Chemical Society, Washington, US; N. L. Mattarella et al.: "Physico-chemical and Functional Properties of Positively Charged Derivatives of Bovine Beta-Lactoglobulin"; pp. 972-976.
Egg Albumen Proteins Interactions in an Angel Food Cake System; Teiko M. Johnson and Mary E. Zabik, vol. 46 (1981) Journal of Food Science; p. 1231, col. 1; p. 1234 col. 2; pp. 1235; 1236, col. 1.
ALBIHNS (H. Algihns Patentbyra AB, letter).

*Primary Examiner*—Jeanette Hunter
*Attorney, Agent, or Firm*—Sheridan Neimark; Karl W. Flocks

[57] ABSTRACT

An aqueous dispersion containing both acidic and basic proteins and gives better foaming, gelling and emulsion properties than solutions of acidic proteins alone. The basic protein may be made by modifying an acidic protein. Improved aerated products such as meringues and nougat may be made using the solutions.

14 Claims, No Drawings

PROTEIN PRODUCT

This invention relates to aqueous solutions containing proteins which are capable of forming foams, gels and/or emulsions.

Protein foams may be obtained by whipping an aqueous solution of a protein. The whipping process comprises agitating the solution in the presence of air so that a foam consisting of air cells surrounded by the solution is formed. The function of the protein in these foams is to form a cohesive film or skin around the air cells to prevent the foam collapsing when whipping is stopped. The solution may contain other constituents such as sugar. Such foams are used for a variety of culinary purposes, such as the making of meringues in which the protein foam containing sugar is baked to produce a mass of air cells enclosed by solid walls of protein and sugar. The protein solution is commonly obtained from white of egg but many other sources of protein may be used.

The foam-forming capacity of a protein solution, as measured by the increase in volume of the solution on whipping, and also the stability on standing of the foam depends in part on the identity of the protein used. For example a solution of egg albumen gives a reasonable degree of expansion on whipping and the foam formed may be stored for a considerable time before collapsing but a solution of ovalbumin or ovotransferrin without other dissolved constituents gives very limited expansion and poor foam stability.

The expansion on whipping and stability of the foam are affected by other constituents dissolved or dispersed in the protein solution. For example the presence of sucrose may increase both expansion on whipping and foam stability but the presence of even small quantities of lipids such as vegetable oils and fats generally suppresses foam formation either partially or completely. It has therefore been difficult to provide a satisfactory protein foam containing oils or fats and when making a protein foam it has been essential to avoid contamination of the solution by lipids, including contamination by yolk of egg.

Aqueous solutions of proteins may also be used to form protein gels which are a constituent of many manufactured foodstuffs. A protein solution may be converted to a gel on heating but a minimum concentration of protein in the solution is generally required to obtain a firm gel. For many solutions of single proteins the minimum concentration for gelling is about 5 g/100 ml.

Aqueous protein solutions (i.e., solutions containing globular proteins) are also used to form emulsions with oil phases. Such emulsions are used in manufactured foodstuffs such as mayonnaises and sauces. It is generally desirable that such emulsions should be stable on storage for long periods, however it is found that solutions of many proteins give emulsions which separate on storage for quite short periods.

The proteins used in culinary applications are normally acidic proteins, that is they have isoelectric points less than 7. The acidic proteins include globular proteins, especially albumins such as ovalbumin, bovine serum albumin, bovine plasma, whey protein isolates and hydrolysed soya isolates.

It has now been found that the degree of foaming which may be obtained from protein solutions and also the stability of the foams obtained can be greatly improved, even in the presence of large amounts of lipids, by using a combination of basic and acidic proteins in the solution. It has also been found that a protein solution containing both acidic and basic proteins shows improved gelling behaviour on heating in that a lower concentration of protein is required to produce a firm gel, and that an emulsion formed from the protein solution and an oil phase is more stable than a similar emulsion in which only acidic proteins are present.

According to one aspect of the invention there is provided an aqueous solution containing at lest one acidic protein and at least one basic protein dissolved therein.

For the purpose of this patent application an acidic protein is one having an isoelectric point of less than 7 and a basic protein is one having an isoelectric point above 7.

The isoelectric point of the basic protein is preferably at least 9.5.

The molecular weight of the basic protein is preferably at least 1000 and it may be of the order of 4,500–5,000 or higher. Examples of basic proteins which may be used are clupeine, lysozyme, thaumatin and monellin. The acidic protein may be obtained from a wide variety of sources including milk, eggs, blood plasma, legumes, meat and microorganisms.

It is desirable that the pH value of the solution should be such that the acidic protein and the basic protein carry opposite electric charges. A pH value of the order of 5 to 8 is generally suitable. For example the basic proteins clupeine and lysozyme have isoelectric points in excess of 10 and the acidic proteins ovalbumin and bovine serum albumin have isoelectric points of about 4.6 so that at pH 7–8 these types of protein carry opposite charges. Although the scope of the invention is not to be limited by theoretical considerations it is believed that the presence in the solution of proteins having opposite electric charges has the effect of stabilizing and strengthening the walls surrounding the air cells when the solution is whipped into a foam, as well as forming a stronger gel on heating and increasing the stability of an emulsion formed from the solution.

The level of acidic protein required in the solution depends upon the application. A concentration of 0.5 g/100 ml or more in the solution is generally suitable for forming a foam. The amount of basic protein required to achieve improved foaming is normally less than that of the acidic protein. A ratio of acidic to basic protein from 100 to 1 to 5 to 1 on a weight basis is usually suitable, the improvement in foam behaviour increasing with the amount of basic protein. It has been found that increasing the amount of basic protein above about 0.05 g/ml gives no further improvement in foaming behaviour when the concentration of acidic protein is 0.5 g/100 ml.

The solution may contain dissolved compounds other than proteins and these compounds may have a synergistic effect in further improving the degree of foaming and foam stability of the solution. Synergistic compounds include compounds which can form hydrogen bonds, such as sugars (for example sucrose) and glycerol and also compounds which reduce the surface tension of the solution, such as ethanediol, ethanediol dimethyl ether and dioxan. The hydrogen bonding synergistic compounds typically have a marked effect on foaming behaviour at concentrations of the order of 1–20 g/100 ml but compounds which reduce the surface tension show synergistic activity at much lower concentrations, for example 0.5 g/100 ml.

The presence of basic protein together with acidic protein in the solution allows stable foams to be formed even in the presence of substantial amounts of lipids. Amounts of oils such as corn oil up to 10% by volume of the solution, or even more, can be added and a stable foam is still obtained. This feature allows satisfactory foams to be obtained from solutions which are contaminated with lipid-containing materials such as egg yolk and also allows the making of foams which contain oils or fats as deliberate constituents. A wide range of aerated food products can thus be obtained. One type of food product which may be made from protein solutions is a meringue, which is made by foaming a protein solution, mixing the foam with sugar and baking the mixture. The mixture may contain fat and other constituents such as cocoa. It is found that protein solutions according to the invention produce meringues which have a lower density, before and after baking, than meringues made using solutions of entirely acidic proteins.

Another food product is nougat, obtained by beating a mixture of a protein solution and a sugar syrup to aerate the mixture followed by addition of further syrup and fat. The use of a protein solution according to the invention allows a nougat of satisfactory density to be obtained using a much smaller amount of protein.

In order to foam a firm gel on heating, that is a gel which does not flow under its own weight, a solution of a protein requires a protein concentration which is above a minimum and for many acidic proteins this minimum concentration is of the order of 5% by weight. This minimum concentration is greatly reduced when a basic protein is present and even when the protein concentration is above that required to give a gel in the absence of basic protein, the addition of basic protein gives a gel of increased strength. Good results are obtained when the weight of basic protein present is at least 10% of the weight of acidic protein although improved gelling behaviour may be obtained with a lower content of basic protein. Typically, a solution of an acidic protein will form a gel on heating for 10 minutes at 100° C. only at a protein concentration of at least 5% by weight but the presence of a basic protein in the solution, in an amount of 10% of the weight of acidic protein, allows a gel to form at a protein concentration of only 1.5% by weight.

Most common naturally occurring proteins are acidic and in general the basic natural proteins, such as clupeine, lysozyme, thaumatin and monellin are expensive and available commercially in only limited quantities. The basic protein used in the present invention may be obtained by modifying an acidic protein to increase its isoelectric point so that it becomes a basic protein. The acidic protein may be modified to neutralize at least some of the acidic, negatively charged amino acid residues of the protein by attaching a nucleophilic group to the carboxyl group, thus increasing the isoelectric point. The nucleophilic group may contain basic nitrogen and be attached by means of an amide linkage. The group may be provided by a neutral or basic amino acid ester, an aminosugar or ammonium ion.

One method of attaching the nucleophilic group to the carboxyl group comprises reacting the protein with a carbodi-imide and causing the adduct so formed to react with a nucleophilic reagent to displace the carbodi-imide group. The reaction is shown in the following scheme:

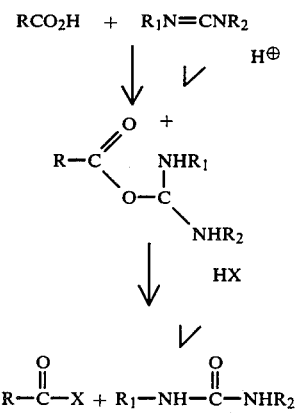

In this scheme $RCO_2H$ is the acidic protein, $R_1$ and $R_2$ may be hydrogen or organic groups and X is the nucleophilic group. The carbodi-imide may be 1-ethyl-3-dimethylaminopropyl carbodi-imide (EDC), reagent HX may be an amino acid ester such as glycine methyl or ethyl ester or arginine methyl ester, an aminosugar such as glucosamine or ammonium ion. The acidic protein may be a readily available protein such as $\beta$-lactoglobulin, ovalbumin, bovine serum albumin, soya protein and whey isolate.

The reaction may generally be performed in aqueous solution at a pH from 4.0 to 7.5 and at or near ambient temperature. The pH may be adjusted as necessary during the reaction by addition of acid. Under these mild reaction conditions the protein does not become denatured. When the reaction is complete the modified protein may be recovered by dialysis and freeze-dried for storage.

The basic proteins so obtained may be used in the same way as the natural basic proteins, with the same beneficial results.

Preparations of basic proteins from acidic proteins are described in the following examples, given by way of illustration.

EXAMPLE 1

An acidic commercial whey protein isolate was dissolved in water to a concentration of 2.0% W/W. The pH of the solution was adjusted to pH 6.0 with hydrochloric acid (0.5M) and glycine ethyl ester was added to a concentration of 5.0% W/W. EDC was added to a concentration of 0.6% W/W and the mixture held at 40° C. for 8 hours. The reaction was stopped by adjusting the pH 3.0 with glacial acetic acid. The reaction mixture was then dialysed against running tap water for 48 hours and the retentate freeze-dried to produce a modified (basic) protein isolate (M.P.I.).

Amino acid analysis of the modified protein thus produced showed that 25% of the carboxyl groups of the original protein had been modified. The isoelectric points of the modified proteins were predominantly higher than pH 9.5, whereas the original whey protein isolate comprised proteins having isoelectric points of about 5.

EXAMPLE 2

The acidic protein $\beta$-lactoglobulin was dissolved in water to a concentration of 1.3% weight/weight. The pH of the solution was adjusted to 4.75 and glycine methyl ester was added to a concentration of 1.33M. EDC was added to a concentration of 0.40M and the mixture was held at 25° C. for 1 hour, the pH being maintained at 4.75 by addition of 0.5M hydrochloric acid as required. The product was then dialysed against water for 48 hours and the retentate was freeze-dried to produce a modified protein.

Aminoacid analysis of the modified protein thus produced showed that 74% of the carboxyl groups of the original protein had been modified. The isoelectric point of the modified protein was higher than pH 10, whereas that of the original β-lactoglobulin was pH 5.

EXAMPLE 3

The procedure of Example 2 was repeated except that bovine serum albumin was used instead of β-lactoglobulin. The isoelectric point of the modified protein so produced was again greater than pH 10.

EXAMPLE 4

The procedure of Example 2 was repeated except that in different trials the glycine methyl ester was replaced by equivalent molar amounts of glycine ethyl ester, glucosamine, ammonium chloride and arginine methyl ester. In all cases the isoelectric point of the modified protein produced exceeded pH 10.

EXAMPLE 5

The procedure of Example 2 was followed but replacing β-lactoglobulin with a purified whey isolate and glycine methyl ester with arginine methyl ester. The isoelectric point of the modified protein produced was greater than 10.

The foaming behaviour of protein solutions according to the invention is described by way of illustration in the following Examples 6 to 11.

EXAMPLE 6

Solutions in water containing the dissolved constituents given in Table 1 below were whipped at ambient temperature for 5 minutes in a food mixer (Kenwood Chef Model A 901) operated at 200 revolutions per minute. The initial volume of the solution before whipping and the volume of the foam produced immediately after whipping were measured. The foam was then allowed to stand undisturbed for 30 minutes at ambient temperature and the volume of liquid which had drained from the foam was measured.

The % foam expansion (FE) and % foam liquid stability (FLS) were calculated as follows:

$$FE = \frac{\text{Foam volume}}{\text{Initial liquid volume}} \times 100$$

$$FLS = \frac{\text{Initial liquid volume} - \text{volume of liquid drained}}{\text{Initial liquid volume}} \times 100$$

In Table 1 the first and second columns give the result obtained with a solution containing 0.5% of an acidic protein alone, the third and fourth columns with the same solutions but containing 0.05% of clupeine, and the fifth to eight columns with the same solutions containing 10% of sucrose. The pH value of all the solutions was 7.

It can be seen from these results that in all the cases the presence of clupeine improved foaming behaviour considerably, although in the cases of egg albumen and ovalbumin the effect was observed only in the presence of sucrose.

EXAMPLE 7

The same procedure as in Example 6 was followed but the solutions had the compositions given in Table 2. The results given in the table show that the addition of clupeine gave good foaming behaviour even in the presence of oil. In these experiments the pH value of the solution was 8. In Table 2 "BSA" is bovine serum albumin, "oil" is corn oil.

EXAMPLE 8

The procedure of Example 6 was followed using solutions containing 0.5% of ovalbumin with or without 0.05% of clupeine and with the additional constituents given in Table 3. The pH value of the solutions was 8. It can be seen from Table 3 that the hydrogen-bonding compounds sucrose and glycerol and also the surface tension-reducing compound ethanediol had a marked synergistic effect on the foaming behaviour of the solutions.

EXAMPLE 9

In order to investigate the effect of differing amounts of clupeine the procedure of Example 6 was followed using solutions of pH 8 containing 0.5% of ovalbumin and 10% sucrose with the concentrations of clupeine shown in Table 4 present. The results show that the clupeine had a marked effect even in amounts of 0.005% and the effect increased at higher clupeine amounts. No further improvement was found with concentrations of clupeine above 0.05%.

EXAMPLE 10

The procedure of Example 6 was followed except that 0.1% of lysozyme was used instead of clupeine. The results are shown in Table 5. These results show that lysozyme has a similar effect as clupeine with and without sucrose present.

EXAMPLE 11

The procedure of Example 6 was followed but using solutions of pH 8 containing 0.5% of bovine serum albumin together with the constituents given in Table 6. It will be noted that in all cases the presence of clupeine gave a large improvement in foaming behaviour.

EXAMPLE 12

The procedure of Example 6 was followed but using the constituents shown in Table 7. The oil used was Mazola vegetable oil and the pH value of the protein solution was 6. The results are shown in Table 7. It can be seen that 1.0% of oil destroyed the whipping properties of the BSA (bovine serum albumin) solution but 10% of oil had little effect on the properties of the BSA/clupeine solution. Large amounts of oil, for example 25%, reduced the foam expansion of the BSA/clupeine system somewhat but increased the foam stability.

The solutions described above may be foamed in order to produce foamed culinary products of kinds which are already known, such as meringues, cakes mixes and batters. They may also be used in aerated food products which contain lipids, such as low calory dietary foods, which have not hitherto been made by a foaming process. Foams made from the protein solutions may also be used for non-culinary purposes, for example as aerated lubricants.

The making of foamed culinary products is described by way of illustration in Examples 13 and 14.

EXAMPLE 13

Preparation of Nougat:

Nougat consists of a frappe of egg white and glucose syrup to which a sugar syrup, fat and sugar to grain are added.

The standard recipe is as follows:

| Ingredient | g | |
|---|---|---|
| Spray dried egg albumen | 15 | 1 |
| Water | 30 | |
| Liquid glucose 42DE | 125 | 2 |
| Sucrose | 760 | |
| Liquid glucose 42DE | 525 | 3 |
| Water | 190 | |
| Icing sugar | 35 | 4 |
| (Hydrogenated palm kernel oil) | 45 | |

Ingredients 1 were mixed and left to soak for at least two hours. 1 and 2 were then beaten to a stiff foam in a Hobart CE100 mixer for 5 minutes on speed (3). The density of the frappe was measured. Meanwhile ingredients 3 were mixed, dispersed over a flame for 1 min, then boiled to 270° F. The resultant syrup was slowly poured into the frappe in a thin stream, while mixing on speed (1). The icing sugar and lastly the melted fat were mixed in on speed (1) and the density of the mixture was measured. The remainder of the mixture was poured into trays lined with rice paper and allowed to grain overnight.

This procedure was repeated with the amounts of egg albumen with and without addition of clupeine and M.P.I., shown in Table 8. The density of the frappe and the final mix are shown in the Table.

When the total protein content was reduced to about half but a basic protein was included a satisfactory product was obtained with the same density of the standard. When the protein content was reduced to half but a basic protein was not included on unsatisfactory product of greater density was produced. In this example "MPI" is a modified protein isolate made by the method of Example 1.

EXAMPLE 14

Preparation of Meringues:

Standard recipe: 150 g protein solutions (pH 7.5), 300 g caster sugar.

A Simon Reels Oven was set at 115° C. Protein solutions were beaten for 6 minutes at top speed in a 5-liter capacity bowl using a Hobart CE 100 mixer fitted with a whisk. Half the caster sugar was added gradually with the mixer at slow speed and then the mix was beaten at top speed for a further 2 minutes. The remaining sugar was gently folded into the mix using a wooden spoon. The mix was poured into a savoy bag and shells were piped out on a metal sheet covered with aluminium foil. The shells were baked for 60 minutes until the outer parts were firmly set. Holes were made in the bases and the meringues dried overnight in a warm oven (balmic at 30° C.).

The densities (g/100 ml) of the meringue mixes and meringues after drying were measured.

Where fat (melted hydrogenated palm kernel oil) was incorporated this was added at the start prior to whipping. When cocoa powder was incorporated this was added with the first part of the caster sugar. The compositions of the protein solutions used and the densities of the products obtained are shown in Table 9, in which "MPI" denotes the modified protein isolate of Example 1.

As seen from Table 9, satisfactory meringues which were as light or lighter than the standards were made using only half the normal amount of egg albumen and a small amount of basic protein (clupeine, lysozyme or M.P.I.). Fat (10%) destroyed the whipping proportions of the egg albumen but when M.P.I. was included a meringue was produced which was only slightly denser than the non-fat standard. This demonstrates the ability of the mixed protein system to overcome fat contamination during meringue production. The presence of cocoa powder (which contains fat) in a normal meringue mix resulted in the meringue being very dense. The presence of basic protein (M.P.I.) resulted in a much lighter meringue.

The following examples illustrates the setting behaviour of some solutions containing acidic and basic proteins.

EXAMPLE 15

The amount of a protein powder required to give a solution of the desired concentration was calculated from its protein content (nitrogen × factor). Distilled water was stirred vigorously with a magnetic stirrer, creating a vortex, and the powdered protein added slowly. Stirring was continued at a reduced speed for 20 minutes. In the case of plasma, the resulting solution was allowed to stand for one hour to allow the insoluble proteins to settle and the upper soluble layer was decanted off (the amount of insoluble protein was compensated for). All the other protein solutions were used direct.

For solutions containing both acidic protein and clupeine, the two components were dissolved separately at twice the required concentration, then mixed in equal quantities. Where necessary the pH was adjusted using 0.5M hydrochloric acid or sodium hydroxide.

12.5 ml samples of the protein/clupeine solutions at the required pH were poured into boiling tubes and heated at the required temperature in a water bath for 20 minutes. After this time the extent of gelation was assessed visually (if on inversion of the tube there was no flow of the solution a gel was considered to have been formed).

The results are shown in Tables 10 to 15.

The behaviour of solutions containing acidic and basic proteins in emulsions is illustrated by the following Example.

EXAMPLE 16

Solutions containing 1 g/100 ml of egg albumen in water and 1 g/100 ml plasma protein in water were prepared. The solutions had a pH value of 6. To samples of these solutions were added 0.16 g/100 ml solution of lysozyme. The solutions were emulsified with equal weights of corn oil by simultaneously pouring the solutions and oil into one side of an ultrasonicator (Minisonic 4 of Ultrasonic Ltd.). The mixture as allowed to circulate through the apparatus for 30 seconds, collected and recirculated through the ultrasonicator four times more. The resulting emulsions were allowed to stand undisturbed for one week in the dark. The percentages of oil and water separation were then measured.

The results obtained are shown in Table 16.

It can be seen that for both egg white and bovine plasma, the lysozyme improved emulsion stability to a considerable extent.

Similar results were obtained using clupeine instead of lysozyme.

TABLE I

Effect of clupeine with and without sucrose on protein foam expansion and stability

| Protein | Distilled Water | | | | 10% Sucrose | | | |
|---|---|---|---|---|---|---|---|---|
| | Protein alone | | + Clupeine | | Protein alone | | + Clupeine | |
| | FE | FLS | FE | FLS | FE | FLS | FE | FLS |
| Egg albumen | 240 | 19 | 160 | 16 | 440 | 35 | 810 | 76 |
| Ovalbumin | 40 | 10 | 40 | 10 | 120 | 10 | 620 | 23 |
| Bovine serum albumin | 340 | 12 | 680 | 54 | 460 | 10 | 800 | 71 |
| Bovine plasma | 260 | 12 | 360 | 30 | 320 | 28 | 800 | 73 |
| Whey protein isolate | 600 | 23 | 780 | 33 | 620 | 19 | 840 | 48 |
| Soy isolate (enzyme hydrolysed) | 500 | 10 | 720 | 68 | 480 | 20 | 760 | 74 |

TABLE 2

Effect of clupeine on protein foaming systems containing oil

| Constituents | FE % | FLS % | Comments on Foam |
|---|---|---|---|
| 0.5% BSA, 10% sucrose | 460 | 10 | pourable |
| 0.5% BSA, 10% sucrose 1% oil | 0 | 0 | no foam |
| 0.5% BSA, 10% sucrose 1% oil, 0.05% clupeine | 720 | 64 | stiff |
| 1% BSA, 10% sucrose, 5% oil | 60 | 0 | no foam |
| 1% BSA, 10% sucrose, 5% oil, 0.1% clupeine | 800 | 81 | very good; stiff |
| 0.5% Whey, 10% sucrose | 260 | 5 | poor foam |
| 0.5% Whey, 10% sucrose 0.05% clupeine | 660 | 35 | good foam |

TABLE 3

Effect of hydrogen bonding compounds and surface tension reducing compounds on protein foam expansion stability

| System | FE % | FLS % | Comments on Foam |
|---|---|---|---|
| Ovalbumin | 40 | 5 | very poor |
| Ovalbumin + clupeine | 40 | 5 | very poor |
| Ovalbumin + clupeine + 10% sucrose | 620 | 22.5 | very stiff |
| Ovalbumin + clupeine + 10% glycerol | 620 | 29.5 | very stiff |
| Ovalbumin + 0.5% ethanediol | 40 | 2 | very poor |
| Ovalbumin + clupeine + 0.5% ethanediol | 560 | 26 | stiff |

TABLE 4

Effect of increasing clupeine concentration on foam expansion and foam stability of protein sucrose system*

| Clupeine Concentration | FE % | FLS % |
|---|---|---|
| 0 | 40 | 5 |
| 0.005% | 300 | 16 |
| 0.010% | 520 | 55 |
| 0.015% | 700 | 66 |
| 0.025% | 720 | 71 |
| 0.05% | 640 | 83 |

*All systems contained 10% sucrose + 0.5% ovalbumin

TABLE 5

Effect of lysozyme on protein foam expansion and stability in the presence and absence of sucrose

| Protein | Distilled water | | | | 10% Sucrose | | | |
|---|---|---|---|---|---|---|---|---|
| | Protein alone | | + Lysozyme | | Protein alone | | + Lysozyme | |
| | FE | FLS | FE | FLS | FE | FLS | FE | FLS |
| Bovine serum albumin | 280 | 12 | 760 | 69 | 360 | 4 | 880 | 85 |
| Whey protein isolate | 600 | 21 | 780 | 47 | 620 | 19 | 840 | 69 |
| Egg albumen | 240 | 24 | 220 | 26 | 440 | 35 | 800 | 90 |
| Ovalbumin | 40 | 10 | 40 | 10 | 120 | 10 | 760 | 54 |
| Ovotransferrin[1] | 100 | 5 | 100 | 5 | 140 | 7 | 420 | 23 |
| Bovine plasma | 260 | 12 | 360 | 24 | 300 | 14 | 760 | 70 |
| Bovine β-globulin | 200 | 5 | 700 | 40 | NT | NT | NT | NT |
| Fibrinogen | 360 | 12 | 80 | 10 | 360 | 31 | 620 | 52 |
| Sodium caseinate | 460 | 14 | 540 | 28 | 320 | 17 | 540 | 23.5 |
| β-Lactoglobulin | 480 | 12 | 680 | 88 | NT | NT | NT | NT |

[1]0.2% solutions used
NT = not tested

TABLE 6

Effect of clupeine on protein foam expansion and stability in the presence of liquid materials

| | FE % | FLS % | Comments |
|---|---|---|---|
| Glycerol Monostearate (monoglyceride) (GMS) BSA = 0.5%; pH = 8 | | | |
| BSA + 0.1% GMS only | 0 | 0 | no foam |
| BSA + 0.1% GMS + 0.05 clupeine | 520 | 40 | reasonable foam |
| Stearic Acid (Free Fatty Acid) BSA = 0.5% pH = 8 sucrose = 10% | | | |
| BSA + 0.1 stearic acid | 100 | 2 | poor foam |
| BSA + 0.1 stearic acid + 0.05 clupeine | 760 | 74 | very good foam |
| Lecithin (phospholipid) BSA = 0.5% pH = 8 sucrose = 10% | | | |
| 0.02% lecithin | 0 | 0 | no foam |
| 0.02% lecithin + 0.02% clupeine | 680 | 45 | good foam |

TABLE 7

| | BSA (1.0%) | | BSA (1.0%)/Clupeine (0.1%) | |
|---|---|---|---|---|
| % oil | % FE | % FLS | % FE | % FLS |
| 0 | 664 | 31 | 720 | 47 |
| 1.0 | 100 | 5 | — | — |
| 5.0 | 172 | 4 | 712 | 51 |
| 10.0 | 128 | 4 | 704 | 49 |
| 20.0 | 176 | 7 | 640 | 60 |
| 25.0 | — | — | 504 | 64 |

TABLE 8

| Protein | Quantity (g) | Frappe Density (g/ml) | Final Mix Density (g/ml) (Before graining) |
|---|---|---|---|
| Egg Albumen | 15 | 0.65 | 1.25 |
| Egg Albumen | 6 | 0.68 | 1.23 |
| Clupeine | 1.5 | | |

TABLE 8-continued

| Protein | Quantity (g) | Frappe Density (g/ml) | Final Mix Density (g/ml) (Before graining) |
|---|---|---|---|
| Egg Albumen | 15 | 0.65 | 0.97 |
| Egg Albumen | 7.5 | 0.71 | 1.38 |
| Egg Albumen | 7.5 | 0.58 | 0.97 |
| M.P.I. | 0.75 | | |

TABLE 9

| Protein | Quantity (g) | Mix Density (g/100 ml) | Baked Density (g/100 ml) |
|---|---|---|---|
| Egg Albumen | 18 | 23.5 | 12.0 |
| Egg Albumen | 9.0 | 25.6 | 14.2 |
| Egg Albumen<br>Lysozyme | 8.1<br>0.9 | 20.2 | 10.1 |
| Egg Albumen<br>Clupeine | 8.1<br>0.9 | 19.8 | 9.1 |
| Egg Albumen | 18 | 19.1 | 9.2 |
| Egg Albumen | 9.0 | 68.7 | 15.7 |
| Egg Albumen<br>M.P.I. | 9.0<br>0.9 | 52.0 | 9.2 |
| Egg Albumen<br>(+ 1% Fat) | 18.0 | NO FOAM AFTER NORMAL WHIPPING TIME (6 min.) | |
| Egg Albumen<br>M.P.I. (+ 1% Fat) | 9.0<br>0.9 | 69.2 | 13.6 |
| Egg Albumen<br>(+ 3% cocoa powder) | 18.0 | 47.5 | 17.2 |
| Egg Albumen<br>M.P.I. (+ 3% cocoa powder) | 9.0<br>0.9 | 66.0 | 12.6 |

TABLE 10

The effects of clupeine and pH on the gelation of BSA and Plasma (95° C., 20 min).

| SYSTEM | pH 4.0 | 5.0 | 6.0 | 7.0 | 8.0 | 9.0 | 10.0 |
|---|---|---|---|---|---|---|---|
| 2% BSA | | | X | X | X | X | X |
| 2% BSA + 0.2% Clupeine | | | | | | | X |
| 2% Plasma | X | | X | X | X | X | X |
| 2% Plasma + 0.2% Clupeine | X | | | | | | X |

- GEL FORMED
X - GEL NOT FORMED

TABLE 11

Effect of Clupeine Concentration on Gelation of BSA (pH 8, 95° C., 20 min.)

| System | Gelation |
|---|---|
| 3% BSA | X |
| 3% BSA + 0.1% Clupeine | X |
| 3% BSA + 0.2% Clupeine | X |
| 3% BSA + 0.3% Clupeine | |
| 1% BSA + 0.5% Clupeine | X |
| 1% BSA + 0.1% Clupeine | |

TABLE 12

Gelation of Plasma (pH 8, 95° C., 20 mins)

| Plasma Conc$^n$ (%) | Plasma alone | Plasma + Clupeine 10:1 Ratio |
|---|---|---|
| 5 | | |
| 4 | | |
| 4 (Dialysed) | X | — |
| 3 | X | |
| 2 | X | |
| 1.5 | X | |
| 1.0 | X | X |

— NOT TESTED

TABLE 13

Effect of Clupeine on the gel strength of plasma gels

| Plasma Conc. % | Temp. °C. | Clupeine Conc. % | Sucrose Conc. % (w/v) | Break point (g) | % Increase in gel strength with Clupeine |
|---|---|---|---|---|---|
| 7.5 | 90 | 0 | 0 | 124 | |
| 7.5 | 90 | 0.7 | 0 | 144 | 16 |
| 5.0 | 90 | 0 | 0 | 50 | |
| 5.0 | 90 | 0.5 | 0 | 51 | 2 |
| 7.5 | 80 | 0 | 0 | 136 | |
| 7.5 | 80 | 0.7 | 0 | 160 | 17 |
| 7.5 | 90 | 0 | 20 | 118 | |
| 7.5 | 90 | 0.7 | 20 | 132 | 12 |
| 5.0 | 90 | 0 | 20 | 23 | |
| 5.0 | 90 | 0.5 | 20 | 33 | 43 |

TABLE 14

| System | Gelation |
|---|---|
| 5% Bipro | X |
| 5% Bipro + 0.1% Clupeine | X |
| 5% Bipro + 0.2% Clupeine | X |
| 5% Bipro + 0.3% Clupeine | X |
| 5% Bipro + 0.4% Clupeine | |
| 5% Bipro + 0.5% Clupeine | X |
| 3% Bipro + 0.1% Clupeine | |
| 3% Bipro + 0.2% Clupeine | |
| 3% Bipro + 0.3% Clupeine | X |

Bipro is a whey protein isolate

TABLE 15

Effect of Clupeine on Gelation of Egg Albumen (pH 8, 95° C.). 20 min.

| System | Gelation |
|---|---|
| 5% Egg Albumen | |
| 4% Egg Albumen | |
| 3% Egg Albumen | X |
| 2% Egg Albumen | X |
| 5% E.A. + 0.5% Clupeine | |
| 4% E.A. + 0.4% Clupeine | |
| 3% E.A. + 0.3% Clupeine | |
| 2% E.A. + 0.2% Clupeine | |
| 1% E.A. + 0.1% Clupeine | X |

TABLE 16

Separation of protein-oil water emulsions after storage for 1 week at ambient temperature

| Egg White | | | Egg White + Lysozyme | | | Plasma | | | Plasma + Lysozyme | | |
|---|---|---|---|---|---|---|---|---|---|---|---|
| % Oil | % Emulsion | % Water | % Oil | % Emulsion | % Water | % Oil | % Emulsion | % Water | % Oil | % Emulsion | % Water |
| 3 | 66 | 31 | — | 82 | 18 | 2 | 67 | 31 | — | 88 | 12 |

We claim:

1. An edible aqueous dispersion capable of forming a foam, a gel or an emulsion comprising at least one non-aqueous phase selected from the group consisting of air, an edible lipid and an edible protein matrix, and an aqueous phase, wherein the aqueous dispersion contains at least one edible globular acidic protein having an isoelectric point of less than 7 and at least one edible basic protein, wherein the basic protein has an isoelectric point of at least 9.5 and a molecular weight of at least 4,500, and wherein the ratio of the concentration of the acidic protein to the concentration of the basic protein is from about 25:1 to 5:1.

2. A dispersion according to claim 1, in which the ratio of the concentration of the acidic protein to the concentration of the basic protein is about 20:1-5:1.

3. A dispersion according to claim 2, in which the ratio of the concentration of the acidic protein to the concentration of the basic protein is from about 10:1 to 5:1.

4. A dispersion according to claim 1, in which the basic protein is selected from the group consisting of clupeine, lysozyme, thaumatin and monellin.

5. A dispersion according to claim 1, in which the basic protein comprises an acidic protein which has been modified to increase its isoelectric point.

6. A dispersion according to claim 5, in which the basic protein comprises an acidic protein to the carboxyl group of which a nucleophilic group has been attached.

7. A dispersion according to claim 6, in which the basic protein comprises an acidic protein which has been caused to react with a carbodi-imide followed by reaction with a nucleophilic agent.

8. A dispersion according to claim 1, which contains at least one sugar.

9. A dispersion according to claim 1, containing at least one compound capable to reducing the surface tension of the aqueous phase.

10. A dispersion according to claim 1, wherein said acid protein is an albumin.

11. An edible product, obtained from a dispersion according to claim 1.

12. An edible product obtained by heating a dispersion according to claim 1.

13. An edible aqueous dispersion capable of forming a foam, a gel or an emulsion comprising at least one non-aqueous, insoluble phase selected from the group consisting of edible lipids and an aqueous phase containing at least one edible globular acidic protein having an isoelectric point of less than 7 and at least one edible basic protein, said basic protein having an isoelectric point of 9.5 and a molecular weight of at least 4,500, the ratio of the concentration of the acidic protein to the concentration of the basic protein being from about 100:1 to 5:1, said non-aqueous phase further comprising air, said dispersion defining cells containing said air, each of said cells being surrounded by a cohesive film formed of said lipid, said acidic protein, and said basic protein, the concentration of said acidic protein being at least 0.5%.

14. The dispersion of claim 13, wherein said acidic protein is an albumin.

* * * * *